(12) United States Patent
Martin Candelario et al.

(10) Patent No.: US 12,017,785 B2
(45) Date of Patent: Jun. 25, 2024

(54) AIRCRAFT EXHAUST MUFFLER WITH A VACUUM INSULATION

(71) Applicant: Airbus Operations S.L., Getafe (ES)

(72) Inventors: Pedro Manuel Martin Candelario, Getafe (ES); Lucas Granja Parejo, Getafe (ES); Carlos Casado-Montero, Getafe (ES)

(73) Assignee: Airbus Operations S.L., Getafe (ES)

( * ) Notice: Subject to any disclaimer, the term of this patent is extended or adjusted under 35 U.S.C. 154(b) by 269 days.

(21) Appl. No.: 17/526,120

(22) Filed: Nov. 15, 2021

(65) Prior Publication Data

US 2022/0161940 A1 May 26, 2022

(30) Foreign Application Priority Data

Nov. 25, 2020 (EP) .................................. 20383027

(51) Int. Cl.
*F02K 1/34* (2006.01)
*B64D 41/00* (2006.01)
*G10K 11/162* (2006.01)

(52) U.S. Cl.
CPC ............. *B64D 33/06* (2013.01); *B64D 41/00* (2013.01); *G10K 11/162* (2013.01)

(58) Field of Classification Search
CPC ....... G10K 11/162; B64D 41/00; B64D 33/06
See application file for complete search history.

(56) References Cited

U.S. PATENT DOCUMENTS

| 3,156,005 | A | 8/1964 | Thompson | |
|---|---|---|---|---|
| 2009/0308686 | A1* | 12/2009 | Sullivan | F01N 1/003 181/255 |
| 2010/0276226 | A1* | 11/2010 | Zhang | F04B 39/0061 181/226 |
| 2013/0298882 | A1* | 11/2013 | Stabnik | F02M 26/47 73/861.63 |
| 2020/0393076 | A1 | 12/2020 | Reid et al. | |

FOREIGN PATENT DOCUMENTS

| CN | 109441605 A | 3/2019 |
|---|---|---|
| CN | 211397703 U | 9/2020 |
| WO | 2019040885 A1 | 2/2019 |

OTHER PUBLICATIONS

European Search Report; priority document.
Unknown, "Aircraft Thermal Insulation High Temperature Vacuum Insulation" Sep. 24, 2020, pp. 1-5.
Unknown, "Is Vacuum Insulation Effective at High Temperatures" Aug. 8, 2020, pp. 1-6.

* cited by examiner

*Primary Examiner* — Forrest M Phillips
(74) *Attorney, Agent, or Firm* — Greer, Burns & Crain, Ltd.

(57) ABSTRACT

An exhaust muffler for an APU of an aircraft, including an exhaust gases inlet, an exhaust gases outlet, a peripheral wall configured to guide a flow of exhaust gases between the inlet and the outlet. The peripheral wall includes at least one vacuum chamber to provide thermal insulation.

18 Claims, 3 Drawing Sheets

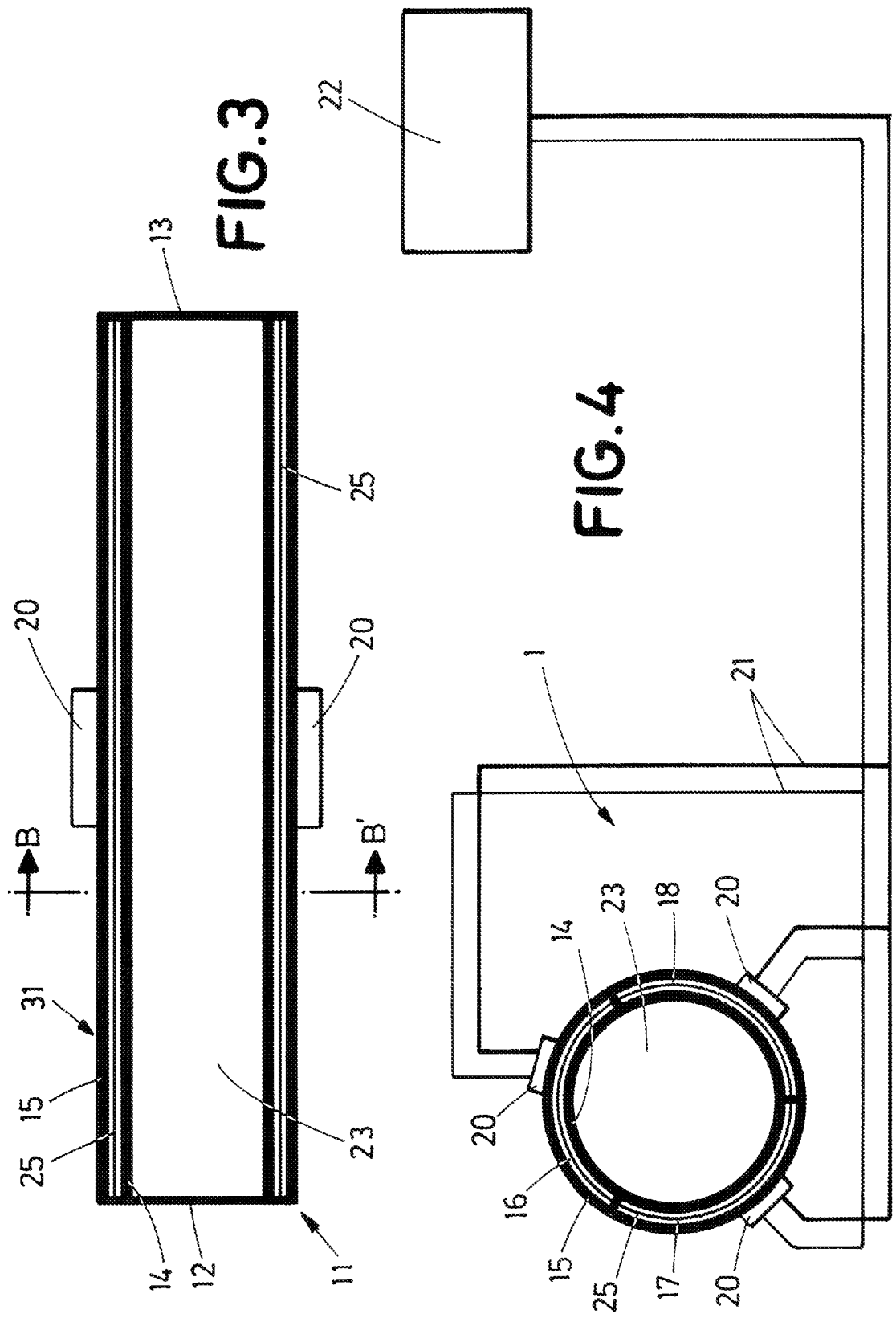

AIRCRAFT EXHAUST MUFFLER WITH A VACUUM INSULATION

CROSS-REFERENCES TO RELATED APPLICATIONS

This application claims the benefit of the European patent application No. 20383027.8 filed on Nov. 25, 2020, the entire disclosures of which are incorporated herein by way of reference.

FIELD OF THE INVENTION

The invention relates to an exhaust muffler of an aircraft. The invention more particularly relates to an exhaust muffler for auxiliary power unit (APU) of an aircraft.

Particularly, an object of the present invention is to provide an exhaust muffler with a high thermal insulation.

BACKGROUND OF THE INVENTION

An APU discharges exhaust gases at high temperatures through an APU exhaust. These temperatures may attain 700 Celsius degrees. Such high temperatures may be harmful to elements adjacent to the exhaust, such as systems or structures, for example to some parts of the fuselage. An APU exhaust therefore needs to be thermally insulated. Without thermal insulation, some parts of the aircraft could be subject to deterioration due to the high temperatures. In current APU exhaust mufflers, thermal insulation is provided by thermal blankets. Some thermal blankets use light foams and fabrics. These foams and fabrics are water absorbent, due to their porosity. Therefore, the foams and fabrics need to be placed in fluid tight locations. In addition, the thermal blankets need to be fire resistant. In order to achieve fire resistant properties, the thermal blankets are enclosed in a shell of corrosion resistant stainless steel (CRES). However, thermal blankets are quite heavy and may represent up to 55% of the exhaust weight.

SUMMARY OF THE INVENTION

The invention intends to provide an exhaust muffler which provides a particularly high thermal insulation.

The invention intends to provide a particularly light exhaust muffler.

The invention also proposes an exhaust muffler that may be particularly compact, in particular, more compact than traditional thermal blankets.

The invention also intends to provide an exhaust muffler that is safe.

The invention proposes an exhaust muffler for an aircraft comprising:
an exhaust gases inlet,
an exhaust gases outlet,
a peripheral wall configured to guide a flow of exhaust gases between the inlet and the outlet,
characterized in that the peripheral wall comprises at least one vacuum chamber.

The exhaust muffler may be part of an exhaust system. More particularly, the exhaust muffler may be part of the exhaust system of an auxiliary power unit (APU) of an aircraft. The inlet may be configured to receive hot exhaust gases from the APU. The outlet may be configured to discharge the exhaust gases to the atmosphere.

According to the invention, a muffler is understood as any piping portion of the exhaust system that requires a certain degree of thermal insulation with its surroundings. Therefore, an exhaust muffler according to the invention may have main functions of guiding a flow of exhaust gases and providing a thermal insulation between the flow of exhaust gases and the surroundings of the muffler, or it may have additional functions such as noise attenuation, for example.

The peripheral wall comprises an inner surface and an outer surface. The inner surface delimitates an interior volume in which a flow of exhaust gases may be guided by the peripheral wall. The inner surface is in contact with the exhaust gases when exhaust gases flow in the interior volume. The finishing of the inner surface of the muffler may be smooth in order to avoid turbulence in the flow of exhaust gases.

The outer surface may be in contact with exterior atmosphere or with other elements of the aircraft such as structures of the fuselage, other systems, or else. The outer surface may, for example, be in contact with elements of an exhaust bulkhead. The outer surface of the exhaust muffler may also be in contact with or at close distance from APU elements and systems. Wirings or conduits may be installed along the outer surface.

The peripheral wall comprises at least one vacuum chamber. The vacuum chamber is a volume confined between vacuum chamber walls which may be subjected to a vacuum state.

The vacuum chamber may have properties such as its volume, its thickness, its length, its width (or radial azimuth), its internal pressure, the remaining gas it may contain, etc.

A vacuum chamber is characterized by a very low internal pressure. The pressure in a vacuum chamber according to the invention may be of, at most, 10-6 mBar, in particular, it may be as low as 10-7 mBar.

Low pressure in the vacuum chamber may be generated by extracting gases from an already manufactured vacuum chamber. Alternatively or in combination, the vacuum chamber may be manufactured in a low pressure atmosphere.

The vacuum chamber is arranged within the peripheral wall such that it provides thermal insulation between the inner surface of the peripheral wall and the outer surface of the peripheral wall. Indeed, the absence of gas in the vacuum chamber(s) reduces heat transfer via convection and conduction.

Moreover, vacuum chambers provide an excellent ratio of thermal insulation to weight. An exhaust muffler according to the invention thereby provides an excellent thermal insulation, while being particularly light.

Vacuum chamber volume is defined by vacuum chamber walls. Vacuum chamber volume may constitute the majority of the exhaust muffler wall volume. The ratio of vacuum chamber volume compared to the wall volume highly influences the thermal performance of the exhaust muffler wall compared to its weight.

In each section of the exhaust muffler, a theoretical average direction of a flow of exhaust gases may be defined when the exhaust gas flows from the inlet to the outlet. The average direction is defined in this whole text as a longitudinal direction. Such longitudinal direction may vary in each section of the exhaust muffler when the exhaust muffler has a non-cylindrical shape.

A radial direction may be defined as a direction perpendicular to a local tangent plane to the outer surface, that is, in most cases, in the direction to the peripheral wall width.

The peripheral wall may comprise more than one vacuum chamber.

The peripheral wall may comprise at least two vacuum chambers.

Multiple vacuum chambers provide multiple benefits. For example, they provide safety redundancy of the thermal insulation. In case the vacuum of a vacuum chamber would become defective, which may be critical while an engine of which the exhaust gases are exhausted through the exhaust muffler of the invention is functioning, another vacuum chamber would still provide some thermal insulation.

An exhaust muffler with multiple vacuum chambers may also allow having a different thermal resistance in different areas of the peripheral wall of the exhaust muffler. The thermal insulation may thus be targeted in specific portions. For example, a portion of the exhaust muffler that is in contact with other elements such as structures, systems, etc., may benefit from a higher thermal insulation while another portion of the exhaust muffler which is surrounded by air once mounted in the aircraft would need less or no thermal insulation.

Also, the dimensions of the vacuum chambers and their arrangement in the peripheral wall may be optimized in order to provide adequate thermal protection while reducing cost and weight.

A portion of the exhaust muffler needing more thermal insulation may comprise a thicker vacuum chamber, and/or it may comprise multiple overlaid vacuum chambers in the peripheral wall's width, while another portion may have no vacuum chamber, or a thinner vacuum chamber and/or only one vacuum chamber in the peripheral wall's width.

The peripheral wall may comprise at least two vacuum chambers in a same transversal cross-section.

Such vacuum chambers may be successively arranged in the peripheral wall radial direction (or width or thickness)—that is to say, they may be overlaid. Such arrangement may provide a better safety and a better local thermal insulation.

Alternatively or in combination, the vacuum chambers may be successively arranged at different angles around the longitudinal direction in successive radial sectors such that a first vacuum chamber is arranged in a first radial sector and one or more vacuum chambers are arranged in other radial sectors around the peripheral wall in a same transversal cross-section of the peripheral wall. This may provide a differentiated thermal insulation on different lateral sides of a same section of the exhaust muffler.

The peripheral wall may comprise at least two successive vacuum chambers between an inner surface of the peripheral wall and an outer surface of the peripheral wall.

The peripheral wall may comprise at least two vacuum chambers in a radial direction. That is to say, the peripheral wall may comprise at least two successive vacuum chambers in its width. Arranging two or more vacuum chambers in the same radial direction provides thermal insulation for this radial section of the peripheral wall, even in case of losing the vacuum state in one vacuum chamber. Such configurations provide an excellent safety performance. Also, the thermal insulation is particularly efficient in such areas of the peripheral comprising two or more overlaid vacuum chambers.

The peripheral wall may comprise at least two successive vacuum chambers between the inlet and the outlet.

That is, the peripheral wall may comprise at least two successive vacuum chambers arranged in the longitudinal direction. A plurality of successive vacuum chambers along the longitudinal direction may also provide a safety redundancy of vacuum cambers, as well as providing a differentiated thermal insulation when different vacuum chambers have different properties along the longitudinal direction.

For example, a first section situated directly downstream from the inlet may comprise a thicker and/or higher number of vacuum chambers in its width than a second section, downstream from the first section.

The peripheral wall may comprise at least one annular vacuum chamber. Annular vacuum chambers are geometrically simple to design and manufacture while providing an efficient thermal protection. An annular vacuum chamber provides homogeneous thermal protection radially around the peripheral wall.

A muffler according to the invention may comprise at least one measuring device configured to detect a pressure change in the at least one vacuum chamber.

The peripheral wall may comprise a measuring device in order to monitor the vacuum state of a vacuum chamber. The measuring device comprises at least one sensor such as a pressure sensor, a temperature sensor, etc. The temperature or variation of temperature in the vacuum chamber may represent a change in the vacuum state of the vacuum chamber. The sensor may, for example, be a thermocouple. The thermocouple may be configured to and arranged so as to measure a temperature inside the vacuum chamber.

The sensor may be installed in the vacuum chamber or outside the vacuum chamber in proximity to the vacuum chamber. In particular, the sensors and their wirings may be installed on the outer surface of the peripheral wall. For example, a measuring device with a temperature sensor placed on the outer surface of the peripheral wall may be configured to detect (at least when a flow of hot exhaust gases circulates in the inner volume of the exhaust muffler) a temperature or a temperature change on the outer surface of the exhaust muffler, reflecting a defective vacuum chamber.

The measuring device may comprise a plurality of sensors.

A plurality of sensors may allow the monitoring of a plurality of vacuum chambers. They may also provide redundancy in the monitoring of the vacuum chamber(s). A same measuring device may be configured and arranged to measure pressure in a plurality of vacuum chambers. Also, two measuring devices may be monitoring a same vacuum chamber or a same group of vacuum chambers, in order to provide redundancy of their measurement.

More particularly, the exhaust muffler may comprise a second measuring device, allowing the monitoring of the vacuum state, even in case of failure of a first measuring device.

The muffler may comprise a plurality of measuring devices; that is, a plurality of sensor sets, each connected to at least one measuring processing unit.

A peripheral wall with few vacuum chambers may provide a good thermal protection while minimizing the manufacturing complexity and minimizing the monitoring of its vacuum state.

The measuring device may comprise a measuring processing unit such as a controller or a processor. Such measuring processing unit may be configured to receive and process vacuum data received from the one or more sensors of the measuring device. The vacuum data is configured to, upon processing of the vacuum data, determine the vacuum state of one or more vacuum chambers.

The measuring device may beneficially be connected to an engine processing unit, such as an engine controller or an engine computer. The engine processing unit is configured to receive vacuum data from the measuring processing unit and/or from one or more sensors directly. The functioning of the engine, such as an APU, may be configured depending on the vacuum state of one or more vacuum chambers of its exhaust muffler. For example, upon detection of a vacuum chamber defect, the engine processing unit may be configured to reduce the throttle of or stop the engine.

Vacuum chamber walls, in a vacuum state, are subjected to structural loads. An exhaust muffler with a peripheral wall comprising multiple vacuum chambers may thus provide a beneficial result in terms of structural resistance. Small vacuum chambers are less structurally demanding. Having multiple vacuum chambers may thus result in a decrease in weight and costs. Vacuum chamber walls are subjected to pressure forces.

At least one vacuum chamber may comprise a structural reinforcement.

The structural reinforcement is configured to distribute the pressure forces on the vacuum chambers walls. Structural reinforcements provide an excellent ratio of structural performance compared to weight.

The peripheral wall may comprise an annular vacuum chamber as the closest vacuum chamber to the peripheral wall inner surface. Due to the annular vacuum chamber small perimeter, the structural load in the annular vacuum chamber walls is reduced, without compromising the thermal insulation.

The peripheral wall may comprise a heat radiation protection layer.

The vacuum chamber(s) limit heat propagation by convection and conduction. The heat radiation protection layer limits heat propagation by radiation. The heat radiation protection layer is selected and arranged in the exhaust muffler so as to minimize heat transfer via radiation from the inner surface of the peripheral wall towards the outer surface of the peripheral wall.

At least one vacuum chamber may comprise a heat radiation protection layer within.

In particular, the heat radiation protection layer may be arranged strictly between an inner surface of the vacuum chamber and an outer surface of the vacuum chamber. The heat radiation protection layer may thus divide the vacuum chamber in:
  an inner volume between its inner surface and the heat radiation protection layer, and
  an outer volume between the heat radiation protection layer and its outer surface.

The heat radiation protection layer may be placed substantially perpendicular to the heat transfer direction in order to maximize its performance.

In some embodiments, the heat radiation protection layer may be placed close to or against the outer surface of the vacuum chamber.

The heat radiation protection layer may be multilayer. The heat radiation protection layer may comprise at least one metallic layer.

This metallic sheet reduces heat transfer via radiation. In some embodiments, only one metallic sheet may be placed between the inner surface and the outer surface of the exhaust muffler.

The heat radiation protection layer may have undergone a surface treatment configured to minimize heat radiation. The surface treatment may, for example, be a surface finishing such as a polishing, and/or the application of a determined heat reflective material. The heat reflective material may, for example, comprise silver (Ag) or gold (Au).

Only some of the vacuum chambers may comprise a heat radiation protection layer. For example, when the exhaust muffler comprises a plurality of vacuum chambers in the longitudinal direction (from the inlet to the outlet), the upstream vacuum chamber(s) may comprise a heat radiation protection layer, while the downstream vacuum chamber(s) may not comprise any heat radiation protection layer. Alternatively or in combination, vacuum chamber(s) on a lateral side of the exhaust muffler that must ensure a higher thermal insulation may comprise a heat radiation protection layer, while other vacuum chamber(s) on another lateral side may not comprise any heat radiation protection layer.

Alternatively, or in combination, the inner surface and/or outer surface of the vacuum chamber may have undergone a surface treatment configured to minimize heat radiation. The surface treatment may, for example, be a surface finishing such as a polishing, and/or the application of a determined heat reflective material. The heat reflective material may, for example, comprise silver (Ag) or gold (Au).

In some embodiments, the peripheral wall may comprise a first inner material and a second outer material, different from the first inner material.

The material of the exhaust muffler wall may influence the ratio of the thermal performance and the weight of the exhaust muffler.

The first material may, for example, be steel, titanium, or any alloy comprising at least one of these metals. The first metal may also be a chromium-nickel alloy, such as, for example, an Inconel® alloy. Also, high-temperature aluminum alloys may be used, provided that exhaust temperatures allow their use. High-temperature alloys are aluminum alloys that present a particular resistance to high temperatures. Some non-restrictive examples of such high-temperature aluminum alloys are A4032, A2618, or NASA 398.

The second material may be steel, titanium, or any alloy comprising at least one of these metals. The second metal may also be a chromium-nickel alloy, such as, for example, an Inconel® alloy. Also, high-temperature aluminum alloys can be used, provided that exhaust temperatures allow its use.

The peripheral wall may be made of a high-temperature aluminum alloy provided that exhaust temperatures allow its use. Aluminum alloy is characterized by a low density and good structural properties.

The peripheral wall may be manufactured with at least two sheets, the sheets being arranged so as to form a conduit for a flow of exhaust gases and joined to each other at their distal ends so as to form at least one vacuum chamber between the sheets.

In some embodiments of a manufacturing method of an exhaust muffler according to the invention, the exhaust muffler may be manufactured in a vacuum environment.

Alternatively or in combination, a manufacturing method of an exhaust muffler may comprise a step of lowering the pressure of the vacuum chamber(s) after one or more other steps of manufacturing the exhaust muffler. In particular, in some embodiments, the exhaust muffler may be manufactured at atmospheric conditions and the vacuum state of the vacuum chambers may be obtained afterwards. The exhaust muffler may thus comprise at least one vacuum port configured to plug a vacuum source to extract gas from one or more vacuum chambers and thus lower the pressure in the vacuum chamber(s). Such vacuum port also allows a restoration of the vacuum state during inspection or maintenance of the exhaust muffler.

The invention extends to an auxiliary power unit (APU) comprising an exhaust muffler according to the invention.

The APU may comprise a processing unit configured to process vacuum data received from one or more sensors or from a measuring device.

The invention also extends to an aircraft comprising an exhaust muffler according to the invention. The invention also extends to an aircraft comprising an auxiliary power unit (APU) according to the invention.

The invention also extends to other possible combinations of features described in the above description and in the following description relative to the figures. In particular, the invention extends to exhaust mufflers comprising features described in relation to the APU and/or the method for manufacturing an exhaust muffler; the invention extends to an APU comprising features described in relation to the exhaust muffler and/or the method for manufacturing an exhaust muffler; the invention extends to methods for manufacturing an exhaust muffler comprising features described in relation to the APU and/or the exhaust muffler.

BRIEF DESCRIPTION OF THE DRAWINGS

Some specific exemplary embodiments and aspects of the invention are described in the following description in reference to the accompanying figures.

FIG. 3 is a schematic representation of a longitudinal cross-section of a second embodiment of an exhaust muffler according to the invention.

FIG. 4 is a schematic representation of a transversal cross-section by the plane B-B of an exhaust muffler according to the embodiment of FIG. 3.

DETAILED DESCRIPTION OF THE PREFERRED EMBODIMENTS

Figure 1:
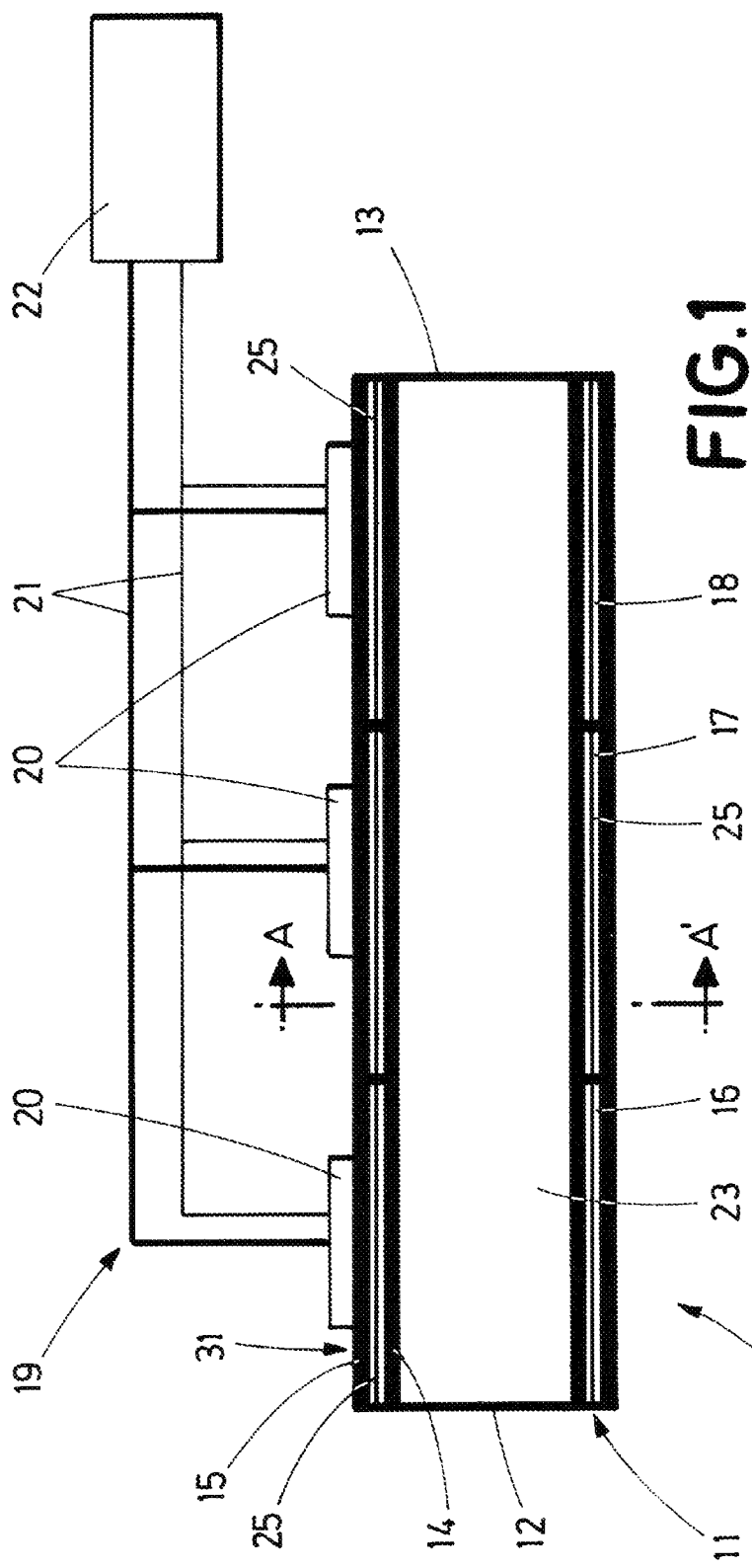
FIG. 1 is a schematic representation of a longitudinal cross-section of a first embodiment of an exhaust muffler according to the invention.

In FIG. 1, a first embodiment of an exhaust muffler 1 according to the invention is presented. It comprises an inlet 12 to admit exhaust gases and an outlet 13 to eject exhaust gases. An interior volume 23 is defined in which exhaust gases may flow from the inlet to the outlet. In this embodiment, the interior volume 23 is cylindrical and delimited by a peripheral wall 31. The peripheral wall 31 comprises a plurality of vacuum chambers 16, 17, 18. The vacuum chambers 16, 17, 18 are arranged between:

an inner layer 14 of the peripheral wall 31, defining an inner surface of the peripheral wall, the inner surface delimiting the interior volume 23, and an outer layer 15 of the peripheral wall 31, defining an outer surface of the peripheral wall.

The inner surface of the peripheral wall may be called a "hot surface" for it is configured to be in contact with hot exhaust gases, while the outer surface may be called a "cold surface" for it is colder than the inner surface when hot gases flow through the exhaust muffler 1.

The inner layer 14 may be of a different material than the outer layer 15.

The material for the inner layer and the outer layer may be chosen from among: steel alloy, titanium alloy, chromium-nickel alloy or high temperature aluminum alloy, provided that exhaust temperatures allow its use.

A surface treatment, such as a polishing and/or the application of a determined heat reflective material, may be applied to the inner surface and/or to the outer surface in order to reduce its thermal emissivity.

Figure 2:
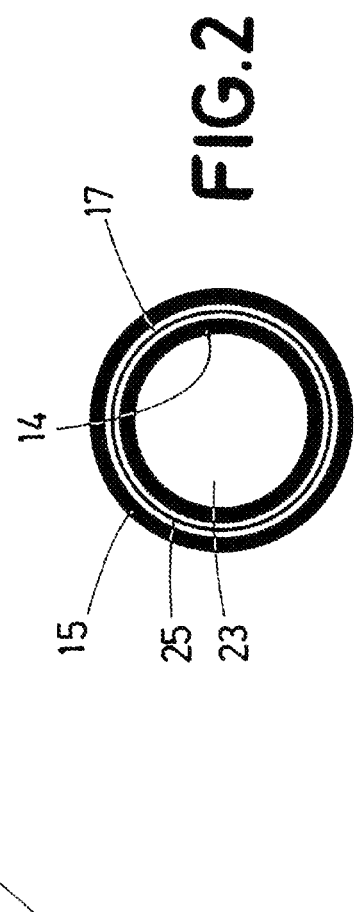
FIG. 2 is a schematic representation of a transversal cross-section by the plane A-A of an exhaust muffler according to the embodiment of FIG. 1.

As can be seen on FIG. 2 representing a transversal cross section A-A of the exhaust muffler shown on FIG. 1, the vacuum chambers 16, 17, 18 each have an annular shape around the interior volume. The vacuum chambers 16, 17, 18 are successively arranged along the axis longitudinal direction of the exhaust muffler 1.

In this embodiment, each vacuum chamber 16, 17, 18 further comprises a heat radiation protection layer 25. The heat radiation protection layer 25 is configured to reflect infrared radiation. The heat radiation protection layer 25 may be a metallic sheet arranged in each of the vacuum chambers 16, 17, 18, between the inner surface of the vacuum chambers 16, 17, 18 and the outer surface of the vacuum chambers 16, 17, 18. The material of this metallic sheet may be chosen from among: aluminum alloy, steel alloy, titanium alloy or a chromium-nickel alloy.

A surface treatment, such as a polishing and/or the application of a determined heat reflective material, may be applied to the heat radiation protection layer. The heat reflective material may be, for example, silver or gold. The reflective material layer may be applied by any known technique.

The exhaust muffler of this embodiment also comprises a measuring device 19. The measuring device comprises a plurality of sensors 20—one for each vacuum chamber 16, 17, 18. The sensors may, for example, be thermocouples.

The measuring device 19 also comprises two wiring networks 21 configured to transmit data from the sensors 20 to a processing unit 22. The processing unit 22 may be a controller or processor, dedicated for the analysis of the vacuum data transmitted by the sensors 20. It may also be an engine computer configured to control a combustion engine of which exhaust gases are exhausted through the exhaust muffler 1. The two wiring networks 21 are redundant networks, so that in case of failure of one network, the other may still be functioning. The data produced by a sensor 20 may also be double-checked.

In other embodiments, the exhaust muffler may comprise a plurality of sensors for a same vacuum chamber.

In a second embodiment represented in FIGS. 3 and 4, the exhaust muffler 1 comprises the same elements as in the first embodiment represented in FIGS. 1 and 2. In this second embodiment however, the vacuum chambers 16, 17, 18 are not arranged successively one after the other along the longitudinal direction, but around the longitudinal direction, each in a different radial sector. The sectorial vacuum chambers 16, 17, 18 are successive to each other around the peripheral wall. In this specific embodiment, each chamber 16, 17, 18 extends along the whole length of the exhaust muffler.

Accordingly, the sensors 20 are organized at different angles around the peripheral wall 31 in order to correspond to the radial position of each vacuum chamber 16, 17, 18.

Figure 5:
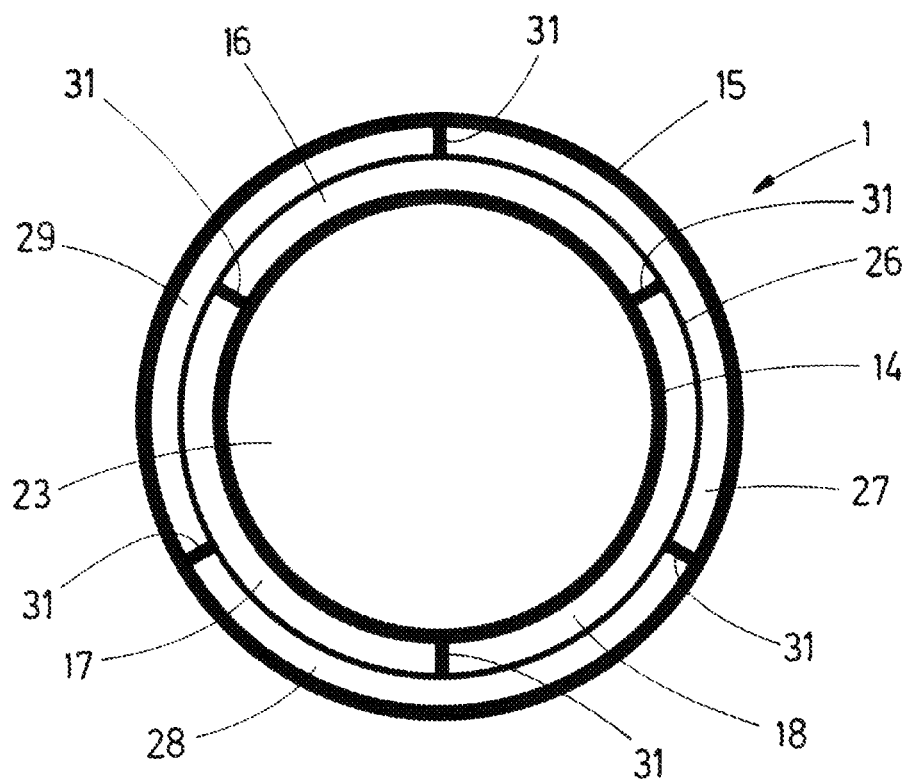
FIG. 5 is a schematic representation of a transversal cross-section of a third embodiment of an exhaust muffler according to the invention.

In FIG. 5, a transversal cross-section of a specific embodiment of an exhaust muffler is represented. In this embodiment, the peripheral wall 31 comprises a plurality of vacuum chambers. A first group of three vacuum chambers are arranged successively around the peripheral wall, thus covering different radial sectors. The first group of vacuum chambers 16, 17, 18 forms an inner thermal insulation layer between the inner layer 14 of the peripheral wall 31 and an intermediate layer 26 of the peripheral wall 31. A second group of three vacuum chambers 27, 28, 29 are arranged successively around the peripheral wall, each covering a different radial sectors. The second group of vacuum chambers 27, 28, 29 is however arranged radially outside the first group of vacuum chambers 16, 17, 18. The second group of vacuum chambers forms an outer thermal insulation layer between the intermediate layer 26 and the outer layer 15 of the peripheral wall 31. The first group of vacuum chambers 16, 17, 18 and the second group of vacuum chambers 27, 28, 29 therefore form two layers of vacuum chambers, thereby improving the thermal insulation and the safety of an exhaust muffler according to the invention. Indeed, even in case of failure of a vacuum chamber, the temperature of the outer layer 15 will be maintained lower than the temperature of the inner layer 14 due to the presence of another layer of vacuum chambers in between.

In this embodiment, the vacuum chambers of the first group do not occupy the same radial sector as the vacuum chambers of the second group—that is: each vacuum chamber of the second group of vacuum chambers is angularly offset around the longitudinal axis of the muffler compared to each of the vacuum chambers of the first group.

In such configuration, the status of the six vacuum chambers may be monitored with only three sensors arranged around the peripheral wall 31, as in the second embodiment described in relation with the FIGS. 3 and 4. As an example, a failure of a vacuum chamber 16 may be detected by sensors placed outside the vacuum chambers 27, 29 because they are partly directly outside the defective vacuum chamber 16.

Figure 6:
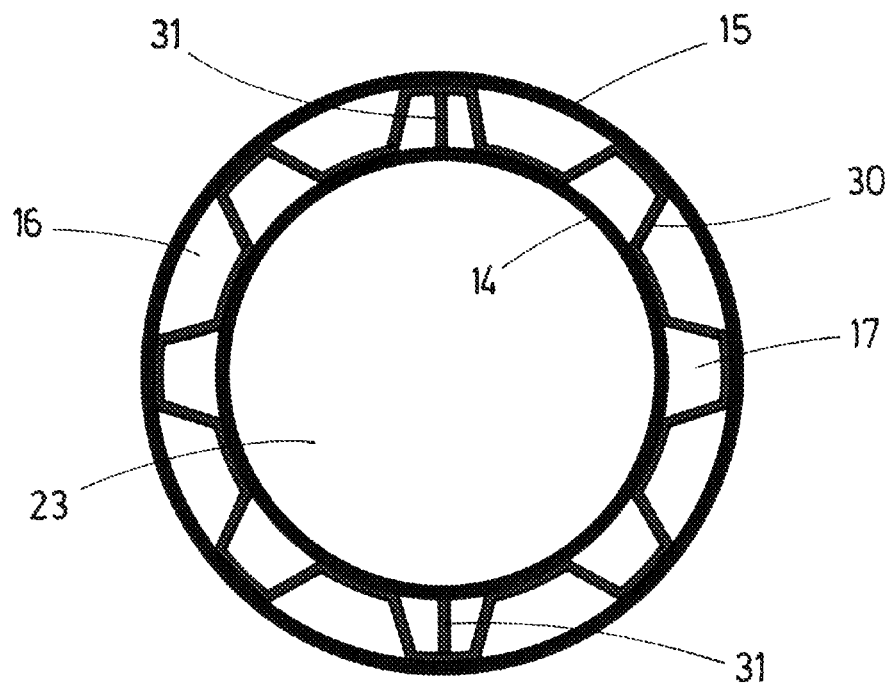
FIG. 6 is a schematic representation of a transversal cross-section of a fourth embodiment of an exhaust muffler according to the invention.

In FIG. 6, a transversal cross-section of another specific embodiment of an exhaust muffler is represented. In this embodiment, the exhaust muffler comprises two vacuum chambers 16, 17 arranged successively around the peripheral wall. Each vacuum chamber comprises a structural reinforcement 30. Such structural reinforcement 30 may allow a limit of the thickness of the inner layer 14 and the outer layer 15 of the peripheral wall, so as to limit the exhaust muffler's weight, while ensuring that the inner layer and outer layer will resist the pressure difference between the interior volume or the outside environment of the exhaust muffler and the vacuum of the vacuum chambers. Annular vacuum chambers of the type presented in relation to FIGS. 1 and 2 may well benefit from such structural reinforcement.

The exhaust muffler may comprise a combination of a plurality of vacuum chambers along the longitudinal direction and/or a plurality of vacuum chambers around the peripheral wall, each covering a different radial sector, and/or a plurality of vacuum chambers in the width of the peripheral wall. Many other embodiments of vacuum chambers arranged in an exhaust muffler according to the invention may be envisaged. A high degree of redundancy and safety may thus be attained. For example, a combination of an annular vacuum chamber in a first inner layer and a plurality of sectorial vacuum chambers in a second outer layer may be envisaged.

Many other variations may be envisaged such as:
- vacuum chambers of a same or different volume and/or thickness and/or length, and/or width in a same exhaust muffler,
- vacuum chambers separated by the same or different walls thicknesses, such that they may be a the same or a different distance from each other,
- implementation of heat radiation protection layer (25) in any vacuum chambers configuration, etc.

The invention is not limited to the specific embodiments herein disclosed as examples. The invention also encompasses other embodiments not herein explicitly described, which may comprise various combinations of the features herein described.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An exhaust muffler for an aircraft comprising:
    an exhaust gases inlet,
    an exhaust gases outlet, and
    a peripheral wall configured to guide a flow of exhaust gases between the inlet and the outlet,
    wherein the peripheral wall comprises at least one vacuum chamber section between the inlet and the outlet comprising at least two successive vacuum chambers in the same transversal cross section between an inner surface of the peripheral wall and an outer surface of the peripheral wall.

2. The exhaust muffler according to claim 1, wherein the at least one vacuum chamber section comprises an intermediate layer between the inner surface and the outer surface of the peripheral wall.

3. The exhaust muffler according to claim 2, wherein the at least one vacuum chamber section comprises two groups of successive vacuum chambers, one group being between the inner surface of the peripheral wall and the intermediate layer, and the other group being between the outer surface of the peripheral wall and the intermediate layer.

4. The exhaust muffler according to claim 3, wherein each group of successive vacuum chambers comprises three successive vacuum chambers.

5. The exhaust muffler according to claim 1, wherein the peripheral wall comprises at least two vacuum chambers sections between the inlet and the outlet.

6. The exhaust muffler according to claim 1, wherein the peripheral wall has an annular shape.

7. The exhaust muffler according to claim 1, further comprising at least one measuring device configured to detect a pressure change in said at least two successive vacuum chambers.

8. The exhaust muffler according to claim 7, wherein the measuring device comprises a plurality of sensors.

9. The exhaust muffler according to claim 1, wherein each of the at least two successive vacuum chambers comprise a structural reinforcement.

10. The exhaust muffler according to claim 9, wherein the structural reinforcement comprises a plurality of trapezoidal members distributed annularly between the inner surface and the outer surface of the peripheral wall.

11. The exhaust muffler according to claim 10, wherein the trapezoidal members of the structural reinforcement are distributed evenly within the peripheral wall.

12. The exhaust muffler according to claim 1, wherein the peripheral wall comprises a heat radiation protection layer.

13. The exhaust muffler according to claim 1, wherein the at least two successive vacuum chambers comprise a heat radiation protection layer within.

14. The exhaust muffler according to claim 1, wherein said peripheral wall comprises a first inner material and a second outer material, different from the first inner material.

15. An auxiliary power unit comprising an exhaust muffler according to claim 1.

16. An aircraft comprising an auxiliary power unit according to claim 15.

17. An exhaust muffler for an aircraft comprising:
an exhaust gases inlet,
an exhaust gases outlet,
a peripheral wall configured to guide a flow of exhaust gases between the inlet and the outlet, the peripheral wall comprising at least one vacuum chamber, and
at least one measuring device configured to detect a pressure change in said at least one vacuum chamber.

18. The exhaust muffler according to claim 17, wherein the measuring device comprises a plurality of sensors.

\* \* \* \* \*